United States Patent [19]

Horian

[11] 4,226,090
[45] Oct. 7, 1980

[54] CONTROL SYSTEM FOR VEHICLE AIR CONDITIONER

[76] Inventor: James G. Horian, 7340 Indiana, Dearborn, Mich. 48126

[21] Appl. No.: 64,324

[22] Filed: Aug. 6, 1979

[51] Int. Cl.³ .............................................. B60H 3/04
[52] U.S. Cl. ....................................... 62/133; 62/324; 123/198 R
[58] Field of Search ................. 62/133, 324, 213, 228; 123/198 R

[56] References Cited

U.S. PATENT DOCUMENTS

| | | | |
|---|---|---|---|
| 3,664,148 | 5/1972 | Yonezu | 62/133 |
| 3,904,885 | 9/1975 | Hollins | 62/323 |
| 4,135,368 | 1/1979 | Mohr et al. | 62/133 |

Primary Examiner—William E. Wayner
Attorney, Agent, or Firm—Reising, Ethington, Barnard, Perry & Brooks

[57] ABSTRACT

A control system (14) for a vehicle air conditioner driven by an associated internal combustion engine of the vehicle is disclosed as including a control circuit (40) for selectively operating the air conditioner to provide cooling of the vehicle in a manner that conserves fuel without appreciably affecting passenger comfort. A sensor (62) of the control system is responsive to an increased power demand on the engine to automatically suspend operation of the air conditioner by the control circuit until the engine output is subsequently increased with respect to the power demand. The control circuit preferably provides electrical operation of the air conditioner compressor which is driven by the engine and the sensor (62) senses the intake manifold vacuum of the engine to automatically suspend compressor operation whenever the vacuum falls below a predetermined extent. A temperature switch (74) of the control circuit senses the engine operating temperature to maintain compressor operation during engine warmup even when the intake manifold vacuum falls below the predetermined extent at which compressor operation is normally suspended. A tachometer (78) of the control circuit senses vehicle speed and operates switch (80) to maintain the compressor operation whenever the speed sensed is above a predetermined value even when the intake manifold vacuum falls below the predetermined extent at which compressor operation is normally suspended.

1 Claim, 2 Drawing Figures

CONTROL SYSTEM FOR VEHICLE AIR CONDITIONER

TECHNICAL FIELD

This invention relates generally to a control system for use with a vehicle air conditioner that is driven by an associated internal combustion engine of the vehicle.

BACKGROUND ART

Vehicle air conditioners conventionally include a compressor driven by an internal combustion engine of the vehicle so as to provide cooling of the vehicle passenger compartment during warm weather. The power demand on the engine during acceleration with the air conditioner operating is relatively high and results in significant fuel usage that lowers the engine efficiency. Likewise, an increased power demand on the engine such as when the vehicle climbs a hill with the air conditioner operating also results in high fuel usage and lower engine efficiency. Of course, the ever-increasing scarcity and cost of fuel makes it more and more desirable to increase the efficiency of vehicle engines.

DISCLOSURE OF INVENTION

An object of the present invention is to provide a control system that effects efficient operation of a vehicle air conditioner in order to reduce fuel usage of the vehicle internal combustion engine which drives the air conditioner.

In carrying out the above object and other objects of the invention, the control system includes a control circuit for selectively providing driving operation of the air conditioner by the vehicle engine in order to provide cooling of the passenger compartment, and the control circuit includes a sensor that is responsive to an increased power demand on the engine to automatically suspend operation of the air conditioner by the control circuit until the engine output is subsequently increased with respect to the power demand.

In its preferred mode, the control system includes an electrical control circuit that controls operation of the vehicle air conditioner compressor and also includes a vacuum sensor that senses the intake manifold vacuum of the engine to automatically suspend operation of the air conditioner compressor whenever the manifold vacuum falls below a predetermined extent. Thus, compressor operation during engine acceleration is suspended in order to decrease the power demand on the engine so as to conserve fuel. Likewise, the compressor operation is suspended when the vehicle begins to climb a hill as a result of the decreased manifold vacuum. In either case, the temporary suspension of the compressor operation does not immediately terminate all cooling to the passenger compartment since the air conditioner evaporator continues to provide a residual amount of heat transfer for cooling the passenger compartment even without the compressor operating. Stop and go city driving where there is a large amount of short term acceleration will thus result in a significant increase in the engine efficiency by use of the control system without appreciably affecting the passenger comfort.

The electrical control circuit of the control system also includes a temperature switch for sensing the engine operating temperature to maintain the compressor operation during engine warmup even when the intake manifold vacuum of the engine falls below the predetermined extent at which compressor operation is normally suspended. Thus, a vehicle whose passenger compartment has become relatively hot during sitting in the sun or within a heated garage, etc. will be cooled as rapidly as possible by the air conditioner and thereafter the operation of the control system will begin in order to conserve engine fuel.

The electrical control circuit of the control system also includes a tachometer that senses vehicle speed to maintain the compressor operation whenever the speed sensed is above a predetermined value even when the intake manifold vacuum of the engine falls below the predetermined extent at which compressor operation is normally suspended. At relatively high speeds, the total engine load is relatively high and the throttle opening to meet the power demand results in a decreased manifold vacuum that could suspend the compressor operation as long as the vehicle travels at the high rate of speed. This undesirable suspension of the air conditioner operation and the accompanying loss of passenger comfort at high speeds is thus prevented by the tachometer control of the compressor.

In its most preferred construction, the electrical control circuit of the control system includes first, second, and third branch circuits for selectively operating the air conditioner compressor. The first branch circuit includes the vacuum sensor that senses the intake manifold vaccum while the second branch circuit includes the temperature switch that is responsive to the engine operating temperature and the third branch circuit includes the tachometer for sensing vehicle speed. All three branch circuits are connected in a parallel relationship with each other and in a series relationship with the selector switch on the instrument panel for operating the compressor by the normal engine electrical system that operates the engine.

The objects, features, and advantages of the present invention will be readily apparent from the following detailed description of the best mode for carrying out the invention when taken in connection with the accompanying drawings.

BEST MODE FOR CARRYING OUT THE INVENTION

Figure 1:
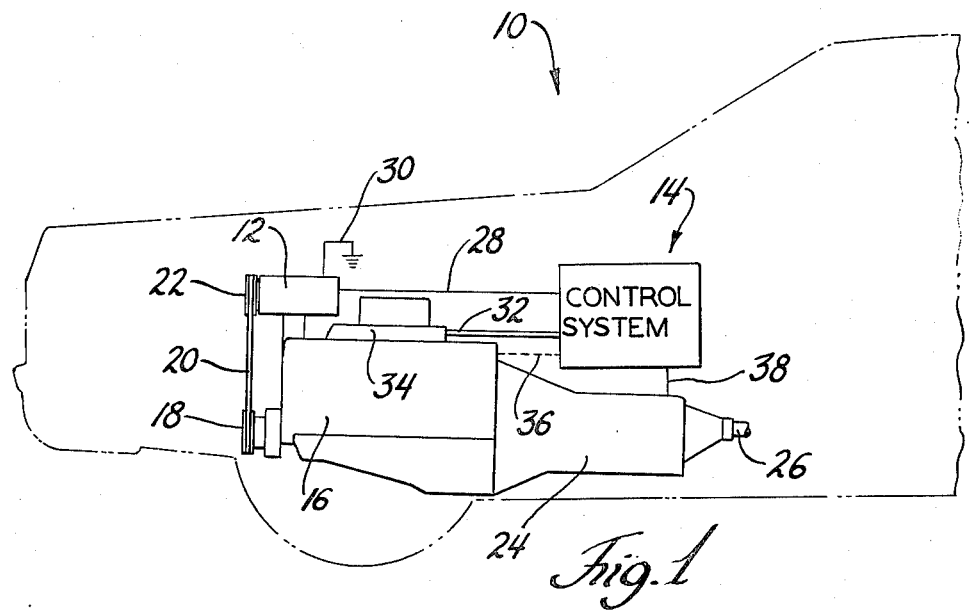
FIG. 1 is a partial view of a vehicle including an air conditioner that is operated by a control system constructed in accordance with the present invention.

Referring to FIG. 1 of the drawings, a vehicle that is generally indicated by reference numeral 10 includes a conventional air conditioner whose compressor 12 is operated by a control system 14 that is constructed in accordance with the present invention. An internal combustion engine 16 of the vehicle is of the conventional type and has a crank shaft whose front end drives a pulley 18 over which drive belt 20 is trained in order to drive a pulley 22 on the compressor 12. The rear end of the crank shaft of the engine 16 drives the input of a transmission 24 whose output is connected to the vehicle drive shaft 26 in order to drive the rear wheels. Of course, the air conditioner control system 14 herein disclosed is also usable with a vehicle having a front wheel drive.

Control system 14 illustrated in FIG. 1 preferably includes an electrical control circuit, as is hereinafter described, and has an electrical connection 28 to the air conditioner compressor 12 so as to selectively energize a clutch of the compressor through a ground connection 30 in order to operate the compressor and the air conditioner by the belt driving off the engine. A conduit connection 32 of the control system with the engine intake manifold 34 provides a signal through which the control system operates the air conditioning compressor 12 in response to the power demand on the engine. Likewise, a phantom line indicated connection 36 with the engine to provide an indication of the engine operating temperature and a cable connection 38 with the transmission to provide an indication of the vehicle speed also provide signals to the control system which are utilized in operating the compressor.

Figure 2:
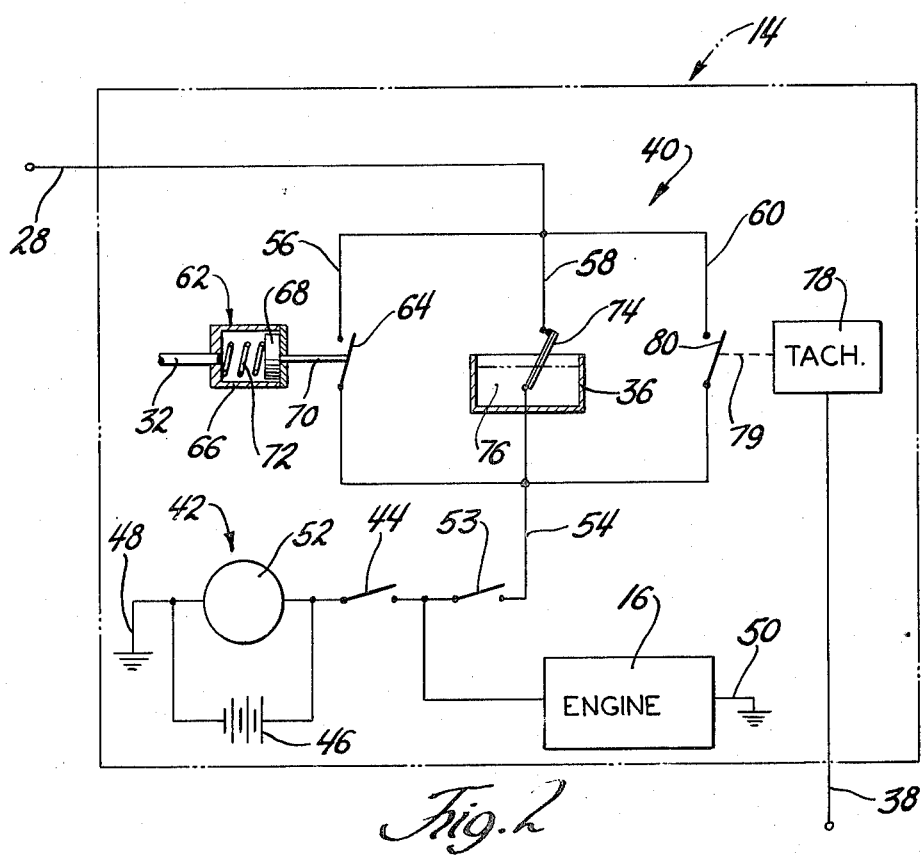
FIG. 2 is a schematic view that indicates the control system for the vehicle air conditioner illustrated in FIG. 1.

As seen in FIG. 2, the control system 14 includes an electrical control circuit 40 between the vehicle electrical system 42 and the compressor connection 28. Closing of the ignition switch 44 of the electrical system energizes the engine 16 by the battery 46 through the ground connections 48 and 50. Thereafter, the schematically indicated generator 52 which is in parallel with the battery 46 maintains the generation of electricity for operating the engine. An air conditioner selector switch 53 is selectively closed to electrically couple a connection 54 thereof with the compressor connection 28 through the control circuit 40.

With continuing reference to FIG. 2, the electrical control circuit 40 of the control system includes first, second, and third branch circuits that are respectively indicated by 56, 58, and 60 and which extend in a parallel relationship to each other between the compressor connection 28 and the engine electrical system connection 54. First branch circuit 56 includes a vacuum sensor 62 that is connected to the engine intake manifold 34 shown in FIG. 1 by the conduit 32 in order to control opening and closing of a switch 64 along this branch circuit. A housing 66 of sensor 62 is fluidly communicated with the conduit 32 and receives a piston 68 that is movable to the left and the right in a sealed relationship and has a connection rod 70 that moves the switch 64 in response to the piston movement. Spring 72 is received within the sensor housing 66 and normally biases the piston 68 toward the right so that the switch 64 is opened. The housing 66 has a suitable opening that communicates the housing chamber on the right side of piston 68 with the atmosphere.

Upon commencement of engine operation, the intake manifold vacuum moves the piston 68 of the sensor 62 shown in FIG. 2 toward the left against the bias of spring 72 and, upon a predetermined extent of vacuum, closes the switch 64 so that the air conditioner compressor is energized through the branch circuit 56. An increased power demand on the engine such as during vehicle acceleration or as the vehicle begins to climb a hill decreases the manifold vacuum so that the spring 72 moves the piston toward the right and opens the switch 64 when the vacuum falls below a predetermined extent. Opening of switch 64 thus terminates the operation of the air conditioner, except as will be hereinafter described in connection with the second and third branch circuits 58 and 60, to thereby decrease the engine load and effect engine efficiency by decreasing the fuel consumption. Subsequently when the engine output increases with respect to the power demand, the accompanying increased manifold vacuum then moves the piston 68 toward the left against the spring 72 to again close the switch 64 compressor. As the compressor operation is suspended by the operation of the vacuum sensor 62, the air conditioner continues to cool the vehicle passenger compartment for a certain amount of time to the extent that the evaporator of the air conditioner still is chilled by the gas compressed by the compressor prior to the suspension of compressor operation. Stop and go city driving where there is frequent acceleration for temporary periods will permit a significant fuel savings by use of the vacuum responsive control system described without sacrificing appreciable passenger comfort.

The second branch circuit 58 of the control circuit 40 shown in FIG. 2 includes a temperature responsive switch 74 which is illustrated as being of the bimetallic type and as sensing the temperature of the engine coolant fluid 76 so as to be responsive to the engine operating temperature. During the initial engine operation, the switch 74 is closed so that the control circuit 40 energizes the compressor for operation during engine warmup even when the intake manifold vacuum is below the predetermined extent at which the vacuum sensor 62 would normally terminate compressor operation. Thus, a vehicle which has been sitting in the sun or in a heated garage is cooled down to a comfortable temperature without any suspension of the compressor operation that could affect passenger comfort. After the engine reaches its operating temperature by which time the passenger compartment will have been normally lowered to a comfortable temperature by the air conditioner operation, the heated condition of the engine coolant fluid 76 opens switch 74 so as to permit the vacuum sensor 62 previously described to operate and control compressor operation except for the operation of the third branch circuit 60.

The third branch circuit 60 of the control circuit 40 shown in FIG. 2 includes a tachometer 78 that is driven by the connection of cable 38 to the vehicle transmission. A connector 79 of the tachometer with a switch 80 along branch 60 opens and closes this switch in response to the speed sensed. Switch 80 is normally open and does not permit the air conditioner compressor to be energized along branch circuit 60 until the vehicle reaches a relatively high speed such as on the order of 45 or 50 miles per hour. As the vehicle reaches this relatively high speed, the tachometer 78 has suitable flyweights or the like for moving connector 79 to close the switch 80 so that the air conditioner compressor will continue to operate even when the manifold vacuum sensed by the vacuum sensor 62 is below the predetermined extent at which the compressor operation is normally suspended. At the high rate of speed where branch circuit 60 is closed, the high load on the engine can require a throttle opening that results in a decreased manifold vacuum that would suspend the air conditioner operation for too long a period of time. Also, once the vehicle is in motion, the fuel savings by use of the control system is not as great and there is no reason to sacrifice any passenger comfort. Branch circuit 60 thus functions to maintain passenger comfort at high speeds without appreciably increasing fuel consumption and also allows the control system to still save fuel at lower speeds during acceleration.

While the best mode for carrying out the invention has herein been described in detail, those familiar with the art to which this invention relates will recognize various alternative designs and embodiments for practicing the present invention as defined by the following claims.

What is claimed is:

1. For use with a vehicle including an internal combustion engine and an air conditioner having a compressor driven by the engine, a control system for the compressor of the air conditioner comprising: an electrical control circuit including first, second, and third branch circuits for selectively operating the air conditioner compressor to provide cooling of the vehicle; the first branch circuit including a vacuum sensor for sensing the intake manifold vacuum of the engine to automatically suspend operation of the air conditioner compressor whenever the intake manifold vacuum is below a predetermined extent; the second branch circuit including a temperature switch for sensing the engine operating temperature to maintain the compressor operation during engine warmup even when the intake manifold vacuum falls below the predetermined extent; and the third branch circuit including a tachometer for sensing vehicle speed to maintain the compressor operation whenever the speed sensed is above a predetermined value even when the intake manifold vacuum is below the predetermined extent.

* * * * *